United States Patent [19]

Lindqvist

[11] Patent Number: 5,638,372

[45] Date of Patent: Jun. 10, 1997

[54] PROVIDING FILLER DATA TO TRANSMITTERS IN A RADIO COMMUNICATION SYSTEM

[75] Inventor: Dan A. Lindqvist, Sollentuna, Sweden

[73] Assignee: Telefonaktiebolaget LM Ericsson, Stockholm, Sweden

[21] Appl. No.: 436,824

[22] Filed: May 8, 1995

[51] Int. Cl.$^6$ .................................................... H04J 3/16
[52] U.S. Cl. .......................... 370/336; 370/350; 455/33.1; 379/59; 379/60
[58] Field of Search .............................. 370/95.3, 95.1, 370/109, 50, 104.1, 85.1, 94.1; 455/33.1, 33.2, 33.3; 379/59, 60; 375/202

[56] References Cited

U.S. PATENT DOCUMENTS

| | | | |
|---|---|---|---|
| 4,332,026 | 5/1982 | Alvarez, III et al. | 370/95.3 |
| 4,621,360 | 11/1986 | Inoue | 370/85 |
| 4,779,093 | 10/1988 | Watkins | 370/85 |
| 5,121,391 | 6/1992 | Paneth et al. | 370/95.1 |
| 5,491,837 | 2/1996 | Haartsen | 370/95.1 |

FOREIGN PATENT DOCUMENTS

| | | | |
|---|---|---|---|
| 233963 | 9/1987 | European Pat. Off. | H04B 7/26 |
| 645903 | 3/1995 | European Pat. Off. | H04B 7/26 |
| WO94/28644 | 12/1994 | WIPO | H04B 7/26 |

OTHER PUBLICATIONS

*European Standard Search Report No. RS 95044*, Date of Completion: 7 Nov. 1995.
Francois Behague, "*Modularity and Flexibility: The Keys to Base Station System Configuration for the GSM Network*", Mobile Radio Conference, Nov. 13–15, 1991, pp. 161–167.

*Primary Examiner*—Douglas W. Olms
*Assistant Examiner*—Shick Hom
*Attorney, Agent, or Firm*—Burns, Doane, Swecker & Mathis, L.L.P.

[57] ABSTRACT

A base station for handling radio communication including flexible filler transmission is described. Therein, plural transmitters share a distributed responsibility to ensure that each time slot on a control channel carrier frequency is transmitted by one of the transmitters, even when no meaningful data is available for transmission. A control channel sign bus is provided which indicates if the control channel is currently scheduled to transmit on the next time slot. Idle transmitters can monitor this bus and, if necessary, provide the filler function when the control channel bus indicates that no transmission is currently scheduled for the control channel.

10 Claims, 5 Drawing Sheets

FIG. 2
(PRIOR ART)
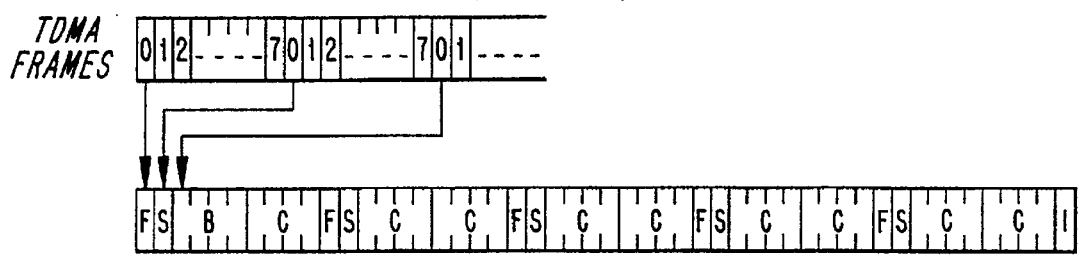
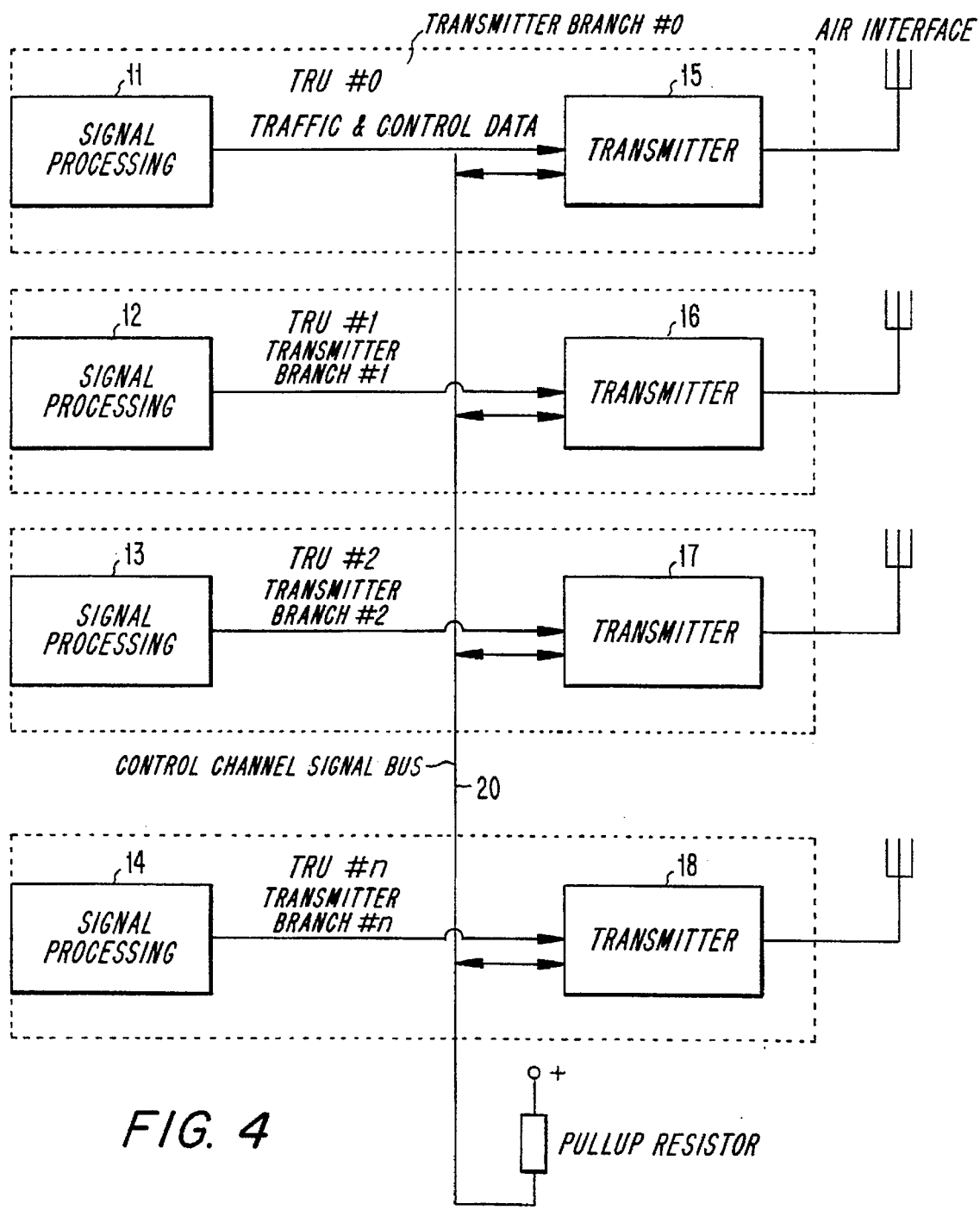
FIG. 4

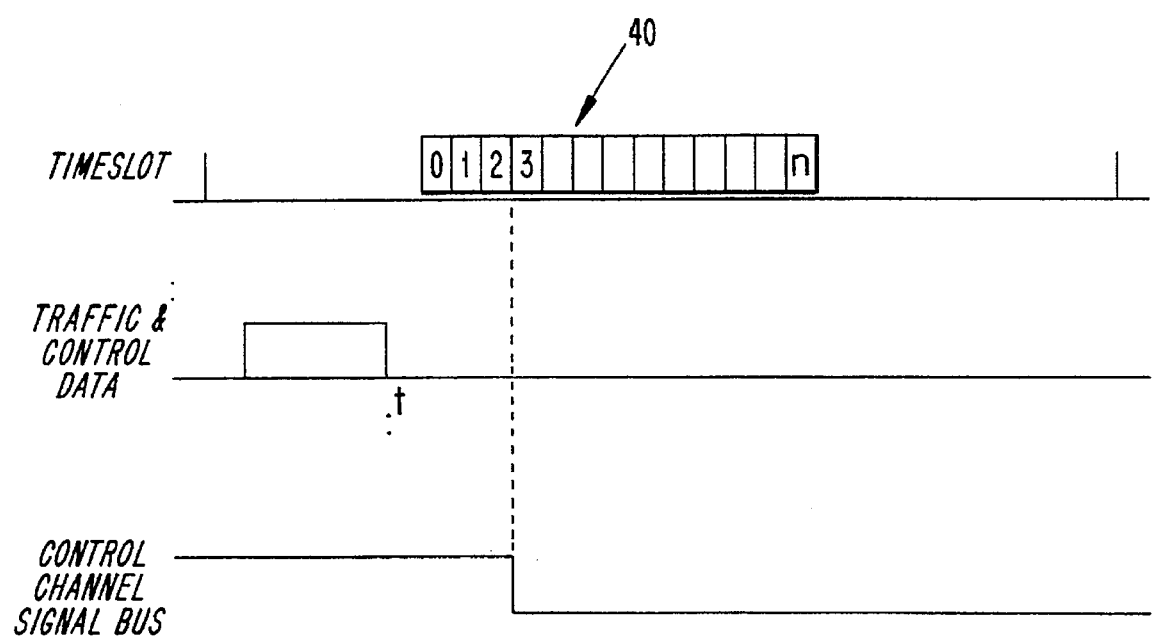

PROVIDING FILLER DATA TO TRANSMITTERS IN A RADIO COMMUNICATION SYSTEM

BACKGROUND

The present invention generally relates to mobile radio communication and, more particularly, to methods and systems in which a base station's transmission of filler data is rendered more flexible.

Many mobile radio communication systems of various kinds are known and in use. In all of these systems, the frequency band(s) available for connections limits the number of possible simultaneous connections, or capacity, of the system. Two base stations or mobile stations transmitting on the same radio frequency of a frequency division multiple access (FDMA) system or on the same time slot of the same radio frequency in a time division multiple access (TDMA) system may interfere with each other. This kind of interference is sometimes called co-channel interference because the interference comes from the same radio channel. If the signal strength of the signals relating to one of the connections is not sufficiently strong relative to the strength of the interfering signals, the information on the first connection will then be more or less unintelligible. If the interfering mobiles or base stations are sufficiently distant from each other, however, the signals relating to the connection will be sufficiently stronger than the interference signals and the information of the connections will be received and properly decoded.

In order to be able to use the same radio channel in FDMA systems, or the same time slot of a radio channel in TDMA systems, for more than one connection, some mobile radio systems are set up as cellular systems. The geographical area to be covered by such a system is divided into smaller areas, called cells, and mobiles in a cell communicate with a base station for that cell. Some or all of the available radio channels are distributed among the cells according to a frequency plan.

A conventional frequency plan provides that different radio channels are allotted to a cluster of adjacent or neighboring cells. No two cells in the same cluster can use the same radio channel at the same time. However, cells in different clusters may use the same radio channels. Thus there can be simultaneous multiple use of a radio channel. Such multiple use is sometimes called channel or frequency re-use. The distance between cells using the same radio channel is known as the re-use distance. The re-use distance is selected so that co-channel interference is kept within tolerable levels. In conventional FDMA or TDMA systems where the same radio channel is used throughout a connection, any co-channel interference will last as long as both the connections last when the transmissions occur more or less simultaneously on the same radio channel. Thus, a worst case situation must be considered in frequency planning and cell cluster design to ensure that the minimum acceptable signal quality is maintained.

Frequency hopping is a technique for ensuring that worst case interference scenarios do not prevail for longer than one frequency hop interval as opposed to the duration of the entire connection, this characteristic is commonly being known as interferer diversity. Frequency hopping also provides frequency diversity which combats fading for slowly moving mobile stations. The European GSM standard describes such a frequency hopping system, which is based on a combination of time division multiple access (TDMA) in which a 4.6 ms time cycle on each frequency channel is divided into eight, 560 μs time slots occupied by different users, and frequency hopping in which the frequencies of each of the eight time slots are independent of one another and change every 4.6 ms.

There are, however, several difficulties associated with frequency hopping systems, in general, and the GSM implementation in particular. For example, frequency hopping in GSM has historically been implemented by selecting a different transmitter for each time slot, each transmitter transmitting on a different, fixed carrier frequency. This type of system will now be described with respect to an exemplary base station illustrated in FIG. 1. Therein, each channel has associated therewith signal processing circuitry denoted by blocks 1–5. Although only five signal processing blocks are illustrated for clarity of the figure, those skilled in the art will appreciate that a typical base station will include many more such circuits.

The base station of FIG. 1 also has a plurality of transmitters 6–10. These transmitters are each configured to transmit on a single carrier frequency and receive data for transmission from various ones of the signal processing units 1–5. This data is conveyed over the baseband switch bus 11. Each of the transmitters 6–10 has a dedicated line in the bus to which each of the signal processing units 1–5 can be independently connected via switches such as the switching junction indicated by reference numeral 12.

As one can imagine, the switching system depicted by bus 11 and switches 12 is rather complex and requires a lot of wiring particularly when considering the actual number of signal processing units and transmitters in each base station as compared with the five exemplary branches illustrated in FIG 1. A partial solution to this switching system complexity is to allow each of the transmitters 6–10 to transmit on different frequencies as controlled by the data received at the transmitters from the signal processors. However, this solution fails to address another difficulty related to how conventional systems handle control channels.

Control channels support system functions such as synchronization, broadcast of system information, call set-up, etc. In GSM, the control channels are also used by the mobiles to make signal strength measurements, which information is used to identify a base station for initial access and to determine an appropriate base station candidate for handover. For example, the mobile stations can use the idle time between active slots for measurements on the control channels of adjacent cells' base stations. Since only a few time slots are available for such measurements, the base stations are required to transmit with constant output power on all time slots of the downlink frequency used for their respective control channels.

FIG. 2 illustrates the multiplexing of a logical control channel combination onto time slot 0 of carrier C0 used as the downlink control channel frequency. Each of the other time slots 1–7 can be used to carry voice or data traffic. Therein, 'F' stands for the frequency correction channel (FCCH), 'S' stands for the synchronization channel (SCH), 'B' represents the broadcast control channel (BCCH), 'C' denotes a common control channel (CCCH) which includes a paging or access grant channel, and 'I' stands for idle. At certain times, however, there is no meaningful information to be transmitted on the control channel. For example, CCCH may have no paging messages to be sent. Moreover, the other time slots 1–7 may have no voice or data traffic to support. At these times, GSM provides for dummy bursts of filler data to be transmitted on otherwise empty time slots to satisfy the requirement that each time slot on the control channel frequency C0 be transmitted on at full power.

Conventionally, this has been accomplished by dedicating a transmitter, for example transmitter 7 in FIG. 1, to the control channel frequency. This allows the system to readily determine when a dummy burst needs to be inserted for time slots to be transmitted by that transmitter. The problem with this solution is that if the filler transmitter 7 malfunctions, then the control channel is lost and no traffic can be handled in that cell until a new transmitter is configured to handle the control channel.

SUMMARY

According to exemplary embodiments, the capability to transmit filler or dummy information on the control channel downlink frequency is distributed among transmitters. In this way, the control channel frequency is continuously transmitted upon even if one or more transmitters malfunction.

For example, a control channel signal bus can be provided which the transmitters can monitor to determine if any transmitter has received data for transmission on the control channel frequency in the next time slot. If none of the transmitters are scheduled to transmit on the control channel frequency, then an idle transmitter will prepare to transmit filler information in the next time slot. This idle transmitter will also drive the control channel signal bus to indicate to other idle transmitters monitoring the bus that the control channel will now be busy in the next time slot so that only one transmitter transmits on the control channel frequency. This allows the filler function in radio communication systems to be provided by all of the transmitters in the system so that the malfunction of any particular transmitter does not result in the loss of the control channel associated with that base station.

BRIEF DESCRIPTION OF THE DRAWINGS

The foregoing, and other, objects, features and advantages of the present invention will be more readily understood upon reading the following detailed description in conjunction with the drawings in which:

FIG. 2 shows conventional multiplexing of a control channel onto time slot 0 of a TDMA frame;

FIG. 4 illustrates a base station according to an exemplary embodiment of the present invention;

FIG. 7 illustrates monitoring timeouts for various transmitters according to an exemplary embodiment of the present invention.

DETAILED DESCRIPTION

Figure 1:
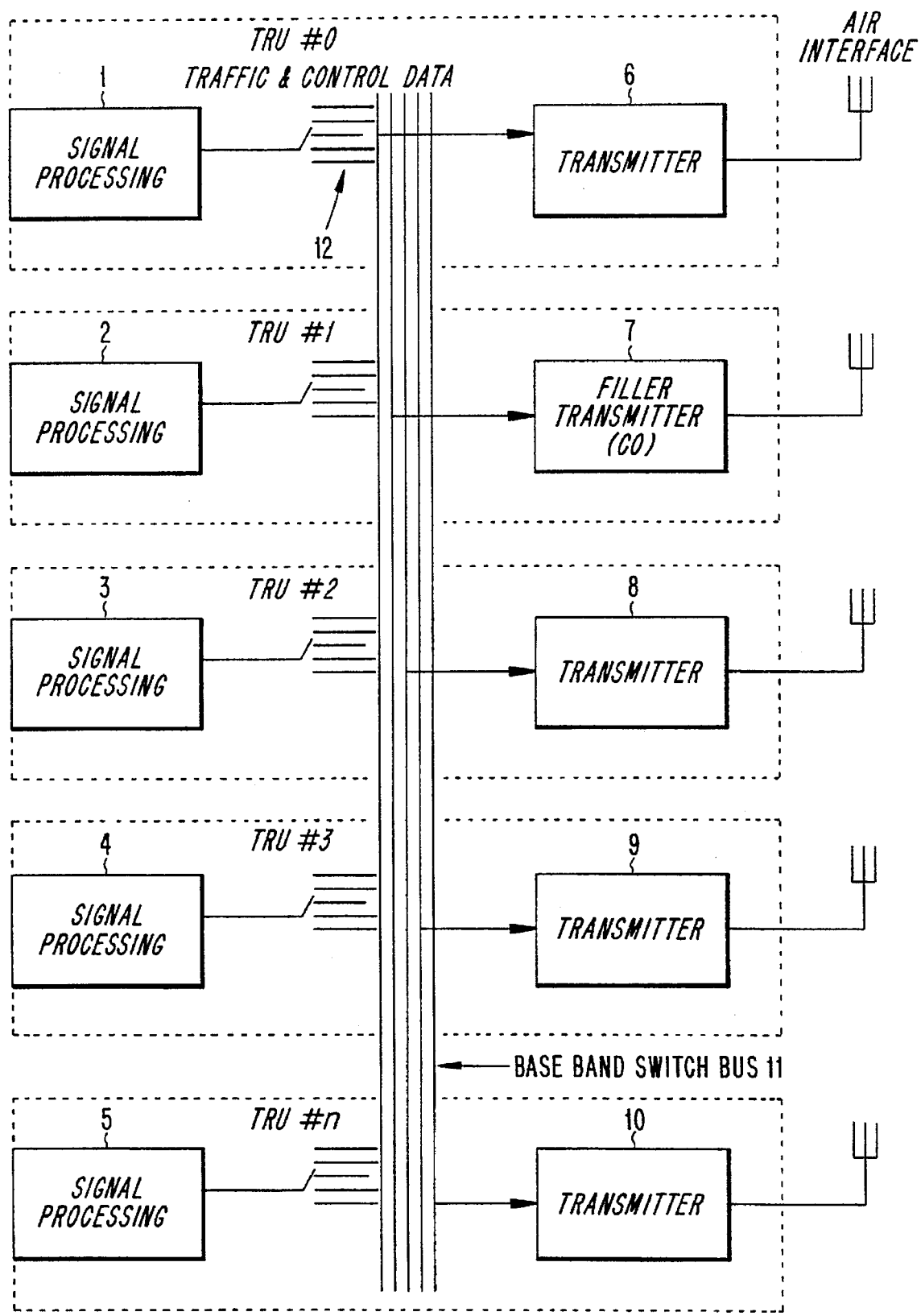
FIG. 1 illustrates a conventional base station.
Figure 3:
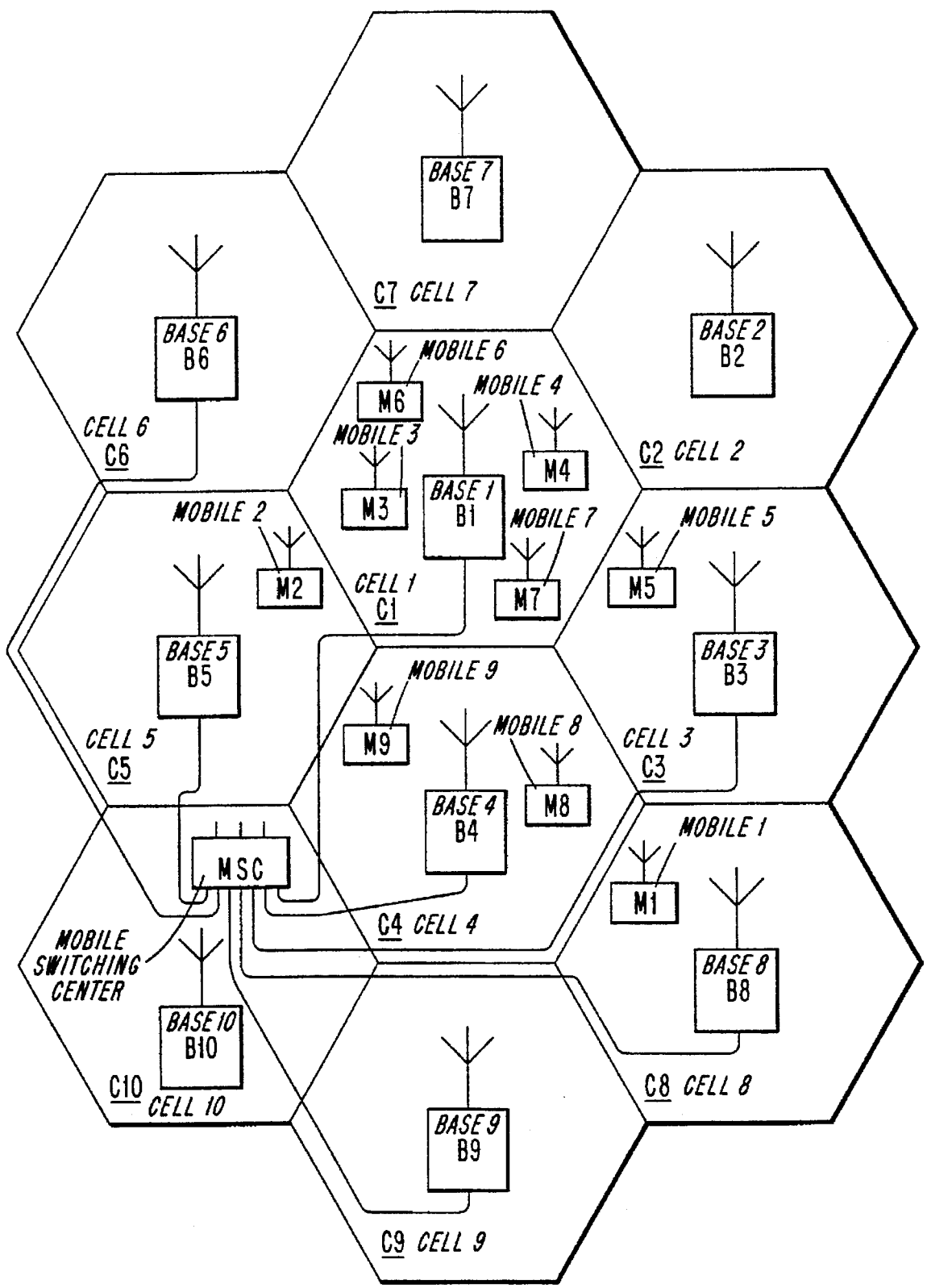
FIG. 3 depicts a cell layout including mobile and base stations.

FIG. 3 illustrates ten cells C1 to C10 in an exemplary cellular mobile radio system. For each cell C1 to C10 there is a corresponding base station, denoted B1 to B10. The base stations are situated in the center of the cells and have omnidirectional antennas. Nine mobile stations, M1–M9, are also shown. They may be small hand held or vehicle mounted stations. The mobile stations are moveable within a cell and from one cell to another. A mobile switching center, abbreviated MSC, is connected to all the base stations by cables or any other transmission media such as a radio or optical link. Some of these cables are omitted in FIG. 1 for simplicity. The MSC is also connected by cables or links to a fixed public telephone network or a similar fixed communication network (not shown).

During operation the mobile stations will be in contact with the fixed part of the system by transmission of radio signals to, and reception of radio signals from, the different base stations. Telephone calls, data communication links or other communication paths can be set up between one mobile station and another mobile station in the system. Calls can also be set up to mobiles in another system or subscribers in the fixed network. For the purposes of this discussion, all of these situations are called connections irrespective of whether they originate in a mobile station or end in a mobile station.

The exemplary system of FIG. 3 is, of course, a simplification as normally the system will comprise more cells and base stations. There can, for example, be umbrella cells each covering an area also covered by a group of micro cells. Also the number of mobile stations will normally be much larger. Base stations located in the vicinity of the cell borders and with sector antennas are also common. Some cells may be served by more than one base station. Several other MSCs with connected base stations will also normally exist and the mobile stations are usually also free to communicate via these other MSCs.

Base stations according to exemplary embodiments of the present invention can be depicted, for example, as shown in the general block diagram of FIG. 4. Therein, like FIG. 1, only a few transmitting branches are illustrated for clarity of the figure. Each of signal processing units 11–14 is shown as being connected to an associated one of the transmitting units 15–18. Comparison with the conventional system of FIG. 1, however, immediately reveals the absence of the complex baseband switch bus 11 and switching junctions 12 found in those conventional systems. Instead, the exemplary system of FIG. 4 includes a control channel signal bus 20 which is bidirectionally coupled to each of the transmitters 15–18. The operation of this exemplary system will now be described.

Each of the transmitters 15–18 is configured to allow frequency hopping. Thus, along with the traffic data sent by the corresponding signal processing unit, control data including a frequency for transmission is also passed to the transmitter. Depending upon the current traffic load and other system scheduling factors, not all of the transmitters will be transmitting in every time slot. Some transmitters will not receive packets of traffic and control data for transmission in the next time slot and are termed "idle transmitters" herein. As mentioned above, one of the transmitters should transmit on the control channel frequency in each time slot. For the purposes of the present invention, the control channel transmitter could be dedicated to the control channel frequency or various ones of the transmitters 15–18 could be instructed to transmit a burst on the control channel frequency for different time slots.

In any event, for most of the time slots, one of the transmitters 15–18 will receive a packet of traffic and control data instructing that transmitter to transmit a burst on the control channel frequency during the next time slot. The transmitter receiving such information will, upon recognition by its associated microprocessor (not shown), drive the control channel signal bus to its active state indicating that the control channel will be busy in the next time slot. As described below, any of the transmitters 15–18 which subsequently determines that it will be idle during the next time slot, then monitors the control channel signal bus 20 to determine whether it is in its active state (i.e., control channel busy during the next time slot) or inactive (i.e., control channel not currently scheduled for transmission during the next timeslot). As described in more detail below, each of the transmitters 15–18 is assigned a unique timeout period during which it monitors the control channel signal bus 20 if it is idle for the next time slot. In this way, if an idle transmitter detects that the control channel signal bus is in its inactive state, that transmitter can then prepare to transmit a filler burst during the next time slot and will also drive the control channel signal bus 20 to its active state so that transmitters which subsequently monitor the control channel signal bus 20 will not also attempt to transmit a filler burst during the next time slot. As shown in FIG. 4, a pullup resistor can be used to change the control channel signal bus between its active and inactive state. However, those skilled in the art will readily appreciate that there are many known techniques for driving a signal line between a high and a low level which could be used to implement this aspect of the present invention. The aforedescribed operations of base stations according to the present invention will now be described by way of several examples with respect to FIGS. 5–7.

Figure 5:
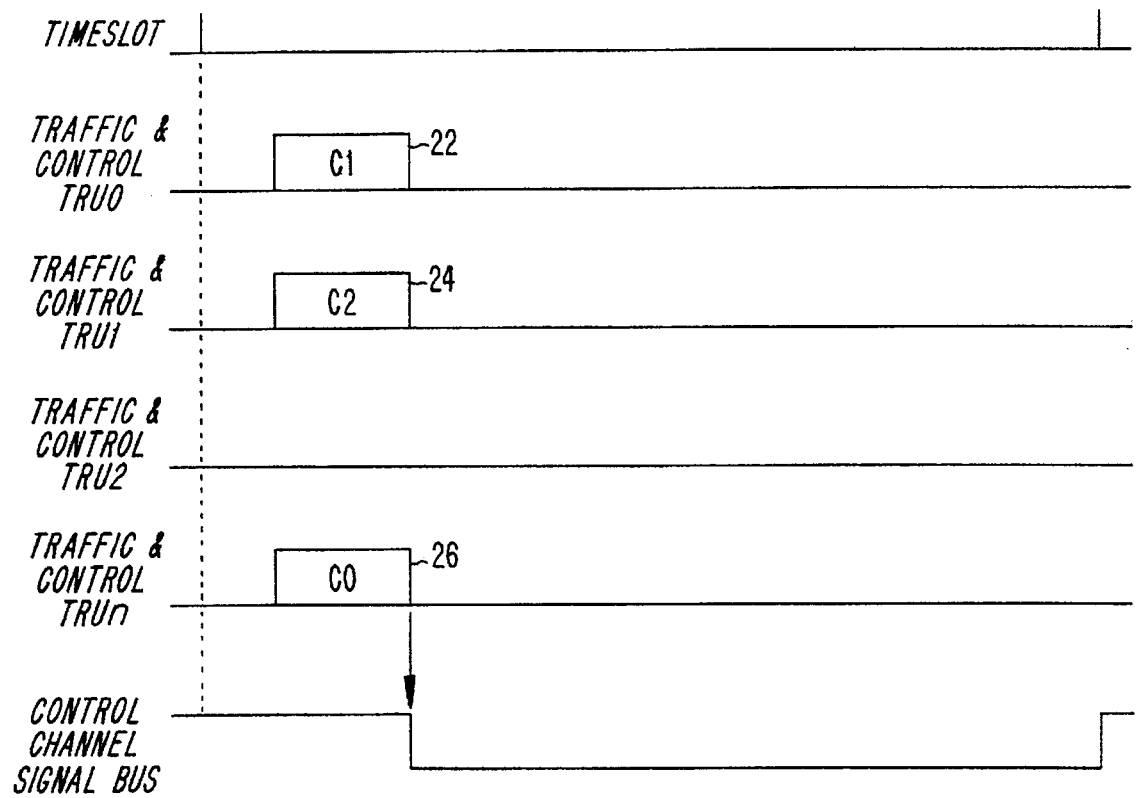
FIG. 5 is a timing diagram illustrating exemplary operation of the base station of FIG. 4 when a transmitter receives data for transmission on the control channel frequency.

FIG. 5 is a timing diagram depicting an ordinary traffic condition wherein one of the transmitters receives a data packet instructing it to transmit on the control channel frequency. Thus, in the example of FIG. 5, transmitter 15 receives a packet 22 of data in a time slot for transmission in the next time slot. This packet 22 indicates, among other information, that the data should be transmitted using carrier C1. Similarly, transmitter 16 receives a packet 24 indicating that it should transmit on carrier C2 during the next time slot. Transmitter 17 does not receive a packet during this time slot and, accordingly, will be idle during the next time slot. Transmitter 18, however, receives a packet 26 indicating that it is to transmit on the control channel frequency C0 during the next time slot. As described above, the traffic data contained therein may relate to the control channel or another channel multiplexed onto the control channel frequency. The microprocessor (not shown) of transmitter 18 drives the control channel signal bus low (active in this exemplary embodiment) after it recognizes that it has been instructed to transmit on the control channel frequency. In this way, as will be become apparent below, the idle transmitter 17 will not attempt to transmit a filler burst on the control channel frequency.

Figure 6:
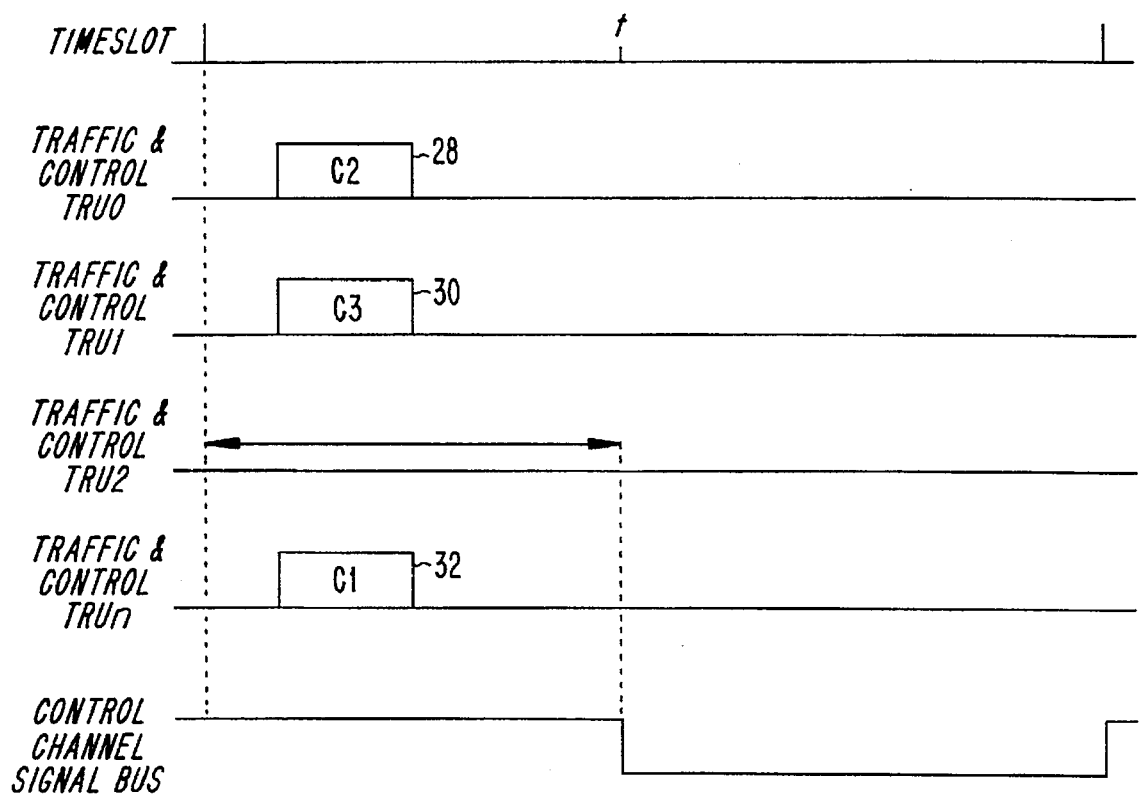
FIG. 6 is a timing diagram illustrating an exemplary operation of the base station of FIG. 4 when none of the transmitters receives data for transmission on the control channel frequency.

FIG. 6 provides another example of operation wherein none of the transmitters receive instructions to transmit on the control channel carrier frequency C0 during the next time slot. As seen therein, transmitters 15 and 16, receive instructions to transmit on carrier C2 and C3 by way of packets 28 and 30, respectively. Again, transmitter 17 receives no instructions during this time slot and will be idle during the next time slot absent any further activity. In this example, transmitter 18 receives instructions to transmit on carrier C1 via packet 32. Thus, the control channel signal bus continues to remain inactive (high) since none of the transmitters have received instructions to transmit on the control channel carrier frequency.

After a period of time during which instructions should be received for the next time slot, idle transmitters, e.g., transmitter 17 in this example, will monitor the control channel signal bus 20 to determine if it is in its inactive state. If so, the first transmitter to monitor the control channel signal bus while that bus is in its inactive state will prepare to transmit a filler burst on the control channel carrier frequency. In this example, transmitter 17 detects that the control channel signal bus is inactive (high in this example) and then drives the control channel signal bus active (low) to indicate that the control channel will be busy during the next time slot.

FIG. 7 illustrates one way in which idle transmitters can be timed to monitor the control channel signal bus. While it is desirable for an idle transmitter to transmit on the control channel frequency when no other transmitters have received instructions to transmit thereon, it is undesirable for multiple idle transmitters to do so. Accordingly, by providing individual timeouts 40 for each of the transmitting units, only one idle transmitter will provide the filler function. As shown in FIG. 7, each of the transmitters which have been sent packets of traffic and control data receive them at least by some time T during a time slot. At some time after that, the first transmitter timeout 0 occurs. If the transmitter corresponding to timeout 0 is idle, then that transmitter would monitor the control channel signal bus 20 to determine its status. In the example of FIG. 7, transmitting units corresponding to timeouts 0 and 1 have received data packets and, accordingly, do not time out to monitor the control channel bus since they cannot perform the filler function during the next time slot. Transmitting unit 2, on the other hand, times out, checks the control channel signal bus, which is currently inactive (high) and determines that it should perform the filler function. Any remaining transmitting units which subsequently monitor the control channel signal bus will find that has been drive active (low) by the second transmitting unit.

The above-described exemplary embodiments are intended to be illustrative in all respects, rather than restrictive, of the present invention. Thus the present invention is capable of many variations in detailed implementation that can be derived from the description contained herein by a person skilled in the art. All such variations and modifications are considered to be within the scope and spirit of the present invention as defined by the following claims.

What is claimed is:

1. A base station comprising:

circuitry for generating data for transmission on at least one traffic channel during a time slot including a data bus for conveying said data to a plurality of transmitters;

a plurality of transmitters at least one of said plurality of transmitters which receives said data from said circuitry, and at least one of which is idle during said time slot, each of said transmitters being capable of transmitting on different frequencies including a frequency for a control channel;

a control channel status bus for indicating a status of said control channel connected to each of said plurality of transmitters;

each of said transmitters having a processor capable of monitoring and driving said control channel signal bus, wherein each said processor determining if said data received from said associated circuitry and data bus is for transmission on said control channel frequency, and, if so, driving said control channel signal bus to indicate that said control channel is busy; and wherein said at least one idle transmitter monitors said control channel signal bus to ensure that transmission occurs on said control channel frequency during said time slot.

2. The base station of claim 1, wherein each of said plurality of transmitters has a unique timeout period during which each idle transmitter monitors said control channel status bus.

3. The base station of claim 2, wherein a processor of an idle transmitter which detects that said control channel is not busy, prepares to transmit filler data during said time slot and drives said control channel status bus to indicate that said control channel is busy.

4. A base station comprising:

circuitry for generating data for transmission on at least one traffic channel during a time slot;

a plurality of transmitters which can each receive data from said circuitry for transmission during a next time slot;

a data bus for conveying said data to said plurality of transmitters; and a control channel status bus for indicating if a transmission is scheduled for said next time slot on a control channel frequency.

5. The base station of claim 4, wherein said plurality of transmitters each include a processor which monitors said control channel status bus when its respective transmitter will be idle in said next time slot.

6. The base station of claim 5, wherein each of said plurality of transmitters is assigned a unique time period during each time slot such that processors of idle transmitters monitor said control channel status bus during their respective unique time period.

7. A method for ensuring transmission in each time slot of a control channel frequency comprising the steps of:

determining, for each of a plurality of transmitters, if data received for transmission on a data bus during a next time slot is associated with said control channel frequency;

driving, if one of said plurality of transmitters received data associated with said control channel frequency, a control channel status bus;

monitoring, by at least one of said plurality of transmitters which did not receive data for transmission during said next time slot, said control channel status bus; and transmitting, based upon a result of said monitoring step, a filler burst during said next time slot by said at least one of said plurality of transmitters which did not receive data for transmission during said next time slot.

8. A base station comprising:

signal processing circuitry for generating data for transmission on at least one traffic channel during a time slot;

a plurality of transmitters, each being capable of transmitting on different frequencies including a frequency for a control channel;

a data bus for conveying said data to said plurality of transmitters;

a control channel status bus connected to each of said plurality of transmitters, wherein each transmitter, when receiving data for transmission on said control channel, drives said control channel status bus to indicate that said control channel is busy; and wherein each transmitter which is not receiving data for transmission monitors said control channel status bus to ensure that transmission occurs on said control channel frequency during said time slot.

9. The base station of claim 8, wherein each of said plurality of transmitters has a unique timeout period during which each transmitter which is not receiving data for transmission monitors said control channel status bus.

10. The base station of claim 9, wherein a transmitter which is not receiving data for transmission which detects that said control channel is not busy, prepares to transmit filler data during said time slot and drives said control channel status bus to indicate that said control channel is busy.

* * * * *